United States Patent [19]
White

[11] Patent Number: 6,045,136
[45] Date of Patent: Apr. 4, 2000

[54] SPLIT SEALING ELEMENT

[75] Inventor: David G. White, Phelps, N.Y.

[73] Assignee: Garlock Inc., Palmyra, N.Y.

[21] Appl. No.: 09/094,812

[22] Filed: Jun. 15, 1998

Related U.S. Application Data

[60] Provisional application No. 60/049,656, Jun. 16, 1997.

[51] Int. Cl.$^7$ ........................................ F16J 15/20
[52] U.S. Cl. ............................ 277/528; 72/145; 264/281; 264/320; 264/326; 425/391
[58] Field of Search ............................... 277/528; 72/145; 264/281, 320, 326; 425/391

[56] References Cited

U.S. PATENT DOCUMENTS

| | | |
|---|---|---|
| 206,695 | 8/1878 | Vivarttas . |
| 567,233 | 9/1896 | Gruber . |
| 734,559 | 7/1903 | Isherwood . |
| 859,329 | 7/1907 | McMullen . |
| 1,307,901 | 6/1919 | Farland et al. . |
| 1,574,412 | 2/1926 | Switzer . |
| 2,173,744 | 9/1939 | Payne . |
| 2,776,154 | 1/1957 | Leistensnider . |
| 2,863,680 | 12/1958 | Taltavall, Jr. . |
| 2,982,999 | 5/1961 | Stewart . |
| 3,062,555 | 11/1962 | Britton . |
| 3,419,280 | 12/1968 | Wheeler . |
| 3,567,149 | 3/1971 | Williamson . |
| 3,582,092 | 6/1971 | Amorese et al. . |
| 3,943,717 | 3/1976 | Schexnayder . |
| 3,945,649 | 3/1976 | Nakamura . |
| 4,064,052 | 12/1977 | Zimmerly . |
| 4,078,739 | 3/1978 | Noé . |
| 4,184,596 | 1/1980 | Avery . |
| 4,189,819 | 2/1980 | Nicholson . |
| 4,239,245 | 12/1980 | Giglio et al. . |
| 4,410,188 | 10/1983 | Copes . |
| 4,456,081 | 6/1984 | Newman . |
| 4,465,442 | 8/1984 | Lang et al. . |
| 4,589,665 | 5/1986 | Arai et al. . |
| 4,616,836 | 10/1986 | Drygalski et al. . |
| 4,617,711 | 10/1986 | McMinn . |
| 4,668,118 | 5/1987 | Bucher et al. . |
| 4,792,146 | 12/1988 | Lebeck et al. . |
| 4,913,951 | 4/1990 | Pitolaj . |
| 4,921,260 | 5/1990 | Takenaka et al. . |
| 4,934,657 | 6/1990 | Dodson . |
| 5,020,809 | 6/1991 | Mullaney . |
| 5,076,771 | 12/1991 | Ban et al. . |
| 5,275,345 | 1/1994 | Stahl et al. . |
| 5,364,247 | 11/1994 | Fukanuma et al. . |
| 5,395,469 | 3/1995 | Suggs, Jr. et al. . |
| 5,545,020 | 8/1996 | Funkanuma et al. . |
| 5,558,491 | 9/1996 | Andrews . |
| 5,577,741 | 11/1996 | Sink . |
| 5,595,697 | 1/1997 | Weda et al. . |
| 5,695,150 | 12/1997 | Chevet et al. . |

*Primary Examiner*—Anthony Knight
*Assistant Examiner*—Karlena D Schwing
*Attorney, Agent, or Firm*—Cummings & Lockwood

[57] ABSTRACT

A split sealing member for a rotary shaft comprising a coiled body, with non-adjoined ends, having a plurality of turns about a central axis, bent along the course of the body such that the body is divided into a radially-inner portion and a radially-outer portion wherein the radially-inner portion defines a first plane and the radially-outer portion defines a second plane which is substantially transverse to the central axis.

14 Claims, 6 Drawing Sheets

SPLIT SEALING ELEMENT

CROSS-REFERENCE TO RELATED APPLICATION

This application claims the benefit of U.S. Provisional Application No. 60/049,656, filed Jun. 16, 1997, the disclosure of which is herein incorporated by reference.

BACKGROUND OF THE INVENTION

1. Field of the Invention

The present invention relates generally to a seal element for sealing along a rotary member. More particularly, the present invention relates to a coiled split sealing element having a sealing lip and the method of manufacture of such a seal. The coiled split lip sealing element finds particular use in process and transfer pumps having a stuffing box.

2. Background of the Related Art

Seal elements are widely used to seal pump and machine shafts. In many machines employed in manufacturing, it is necessary to provide a seal between a rotary member, such as a shaft, and a stationary member, such as a housing. Likewise, seals are employed between rotary housings and stationary shafts, pipes, studs, etc. Although conventionally structured from wear resistant materials, seals nevertheless in time will wear away or become corroded. Therefore, seals are replaced at relatively frequent intervals.

Integral seal elements are seals that are integrally formed, that is not split. Integral seals are widely employed. However, they generally require the removal of machine parts which surround or are adjacent to the part being sealed, such as the rotary member, in order to allow ample access room to permit seal replacement. Disassembly and re-assembly of such parts often requires a great expenditure of time and labor, with a consequent monetary cost. For example, where a shaft extends from a housing, the exterior bearing or journal member for such shaft, as well as the coupling parts to the shaft and external parts of the housing, may have to be removed before the integral seals can be brought into access position for removal. The cost for such repair may be considerable, as product is lost during the interval of machine down-time.

One type of prior art integral seal is manufactured with a compression lip. So-called "lip seals" have a flexible hinged lip on the seal base that permits for firmer pressure against the radial face of the shaft or other item to which the seal element is attached. The lip permits a somewhat self-adjusting seal, in particular when the shaft is dynamic. Lip seals are frequently molded of elastomeric material, such as nitrile rubber, or polymeric material, such as polytetrafluoroethylene. The are not infrequently used to surround a shaft in a sealing relationship to provide a fluid or gas tight chamber in a housing from which the shaft extends.

Integral seals may also be deflected in such manner as to form so-called "sleeve seals". Sleeve seals are generally flat or conical radially extending washers which are deflectable both axially and radially by a relatively rotating surface to form a seal.

Split seal elements are used in many applications wherein integral solid seals would be difficult or time-consuming to install. Employment of split seals may reduce the time for replacing a seal from 24 hours (if a solid integral seal was employed) to less than an hour. Split seal elements are frequently bolted together, squeezed together with an "O" ring or squeezed together on a taper. Bolted split seal elements are relatively expensive, and generally require a large amount of space for the seal. Split seal elements that are squeezed together with an "O" ring are generally limited to use with respect to shafts having a low rotational speed, since centrifugal forces tend to open the split halves at high rotational speeds. While split seal elements which are squeezed together with a taper are somewhat more adaptable, the alignment of surfaces has to be near perfect in order to prevent leakage. Further, while generally providing for more flexibility in the shaft diameter ranges in which they may be employed, split seal elements like integral-solid seals suffer from a relatively inflexibility in the array of rotary diameters on which they may be employed.

Spiral packing seals have also been employed in the art (see, e.g., U.S. Pat. No. 3,945,649). Such seals are generally split. Such seals are usually employed to seal a shaft in a fluid tight manner to prevent leakage. The shaft is sealed by winding the spiral member around the shaft in a stuffing box. Such seals are not infrequently used when the vessel contains a fluid of high pressure, for instance, in centrifugal and plunger pumps.

Both integral seals and split seals have been employed in so-called "mechanical seal" systems. A typical mechanical seal would include a stationary sealing ring sealed by an o-ring gasket to the housing and a spring loaded sealing member secured to the shaft or sleeve on the shaft that rotates with the shaft. The rotating sealing member is usually spring loaded in some fashion to insure that, as the sealing surfaces wear, the spring will keep the rotating sealing member engaged with the stationary sealing ring. Mechanical seals are frequently used to seal stuffing boxes of process and transfer pumps.

Seals may be made of numerous materials, such as, for example, rubber, cast iron, plastics, polytetrafluoroethylene ("PTFE"), and other such materials that perform the sealing function. The material from which a seal is fabricated is generally dictated by the application in which it is intended to be used. For example, while PTFE seals have good corrosion resistance, they have proven unsatisfactory under high external loads at high temperatures and pressures due to high creep relaxation and cold flow problems. Further such seals are prone to failure due to an inadequate modulus of elasticity resulting in the seal not be elastically urged firmly against the inside diameter of the shaft to which it is attached.

All conventional seals suffer from drawbacks, primarily related to a improper sealing (and therefore leakage), and to the need for frequent replacement of such seals when they are attached to moving shafts. Therefore, there is a need for an improved shaft sealing element which would provide an improved seal around the shaft, require less frequent replacement and that would provide for easy exchange of the used seal for a new seal in requiring minimal dissassembly of the machine parts surrounding the shaft when the seals are exchanged.

SUMMARY OF THE INVENTION

It is an object of the present invention to provide for an improved sealing element for use on rotating elements of a machine. It is a further object of the present invention to provide a sealing element permitting easy exchange and requiring minimal disassembly of the machine parts surrounding the rotating member on which it operates. It is a further object of the present invention to provide a sealing element which provides improved adaptability with respect to the rotating element diameters on which it is employed. It is a further object of the present invention to provide a split sealing element which minimizes leakage along the splits. The present invention accomplishes these and other objects thereof by providing a coiled split seal having a compression lip. By coil it is meant a winding of material. By multi-coil it is meant two or more windings such that the wound material is found in more than one plane.

One representative aspect of the present invention includes a split sealing element for a rotary shaft comprising: a coiled body, with a non-adjoined ends, having a plurality of turns about a central axis, bent along the course of said body such that said body is divided into a radially-inner portion and a radially-outer portion wherein said radially-inner portion defines a first plane and said radially-outer portion defines a second plane which is substantially transverse to said central axis. Preferably the first plane and second plane define an oblique angle therebetween.

Another representative aspect of the present invention includes a spiral seal in a housing, defining a bore and having a rotary shaft in the bore, the spiral seal being mounted around the rotary shaft in sealing relationship thereto, to provide a sealed chamber in the housing, the spiral seal comprising: a multi-coiled body with non-adjoined ends, bent along the course of the body such that the body is divided into a radially inner portion and a radially-outer portion, the radially-inner portion being in sealing contact with the rotary shaft and said radially-outer portion being fastened to said housing.

Another aspect of the invention includes a coiler of the flat sheet material comprising: a base; a hollow tubular housing operatively connected to the base, the tubular housing encompassing a void, preferably a uniform cylindrical void; a rotatable winding shaft operatively positioned in the void having continuous stepped shelving coursing about the rotatable winding shaft; wherein the tubular housing further includes an opening in the body of the housing dimensioned so as to permit the flat sheet material to fit through the opening and the bottom portion of the opening being positioned such that the flat sheet material in fed along the bottom portion of the opening causes the flat sheet material to be engaged between the continuous stepped shelving of the rotatable winding shaft.

Yet another aspect of the present invention is a die for applying a lip to coiled flat sheet material surrounding a coil void comprising: a first die body having an upper surface and a lower surface and surrounding a uniform cylindrical void about a central void axis passing from the lower surface to the upper surface such that the first die body has an upper void opening and a lower void opening therein; a second die body having an upper surface and a lower surface, the second die body surrounding a generally cylindrical void about a central void axis passing from the lower surface to the upper surface, such that the second die body has an upper void opening and a lower void opening therein, the generally cylindrical void being interrupted by a counter bored internal step in the second die body, whereby such generally cylindrical void is divided into a larger diameter cylindrical void on top of a smaller cylindrical void; a means for clamping the first die body to the second die body such that the central void axes of each are aligned; a cylindrical plunger operatively associated with the first and second die bodies and the means for clamping.

Another aspect of the present invention is a method of manufacture of a coiled split sealing member comprising: a) winding a flat sheet of material width-wise about a coiler shaft having continuous stepped shelves thereon; b) removing the wound flat sheet material from said coiler shaft so as to obtain a wound flat sheet coil; c) placing the wound flat sheet coil between two die bodies having a generally cylindrical bore in such a manner that the central axis of the bore of each body is aligned with the other, thereby forming a thorough bore, and such that one circumferential portion of the wound flat sheet coil is held between the die bodies and a second circumferential portion hangs into the thorough bore; d) clamping the two die bodies together; e) plunging a plunger through the thorough bore between the two die bodies to form a bend along the longitudinal course of said flat sheet coil; f) removing said bent flat sheet coil from between said two die bodies.

And yet further disclosed is an improved annular seal for sealing around a rotary shaft wherein the improvement comprises a compression lip applied to the split annular seal formed by a bend along the longitudinal course of the material.

BRIEF DESCRIPTION OF THE DRAWINGS

So that those having ordinary skill in the art to which the subject invention appertains will more readily understand how to make and use the coiled split seal element described herein, and in order to further set forth other features and intended advantages of the present invention, preferred embodiments of the invention will be described in detail herein below with reference to the drawings wherein.

DETAILED DESCRIPTION OF THE PREFERRED EMBODIMENTS

The coiled split lip seal of the present invention is preferably comprised of two or more coils, more preferably three or more coils, and yet more preferably four or more coils, such that the split ends are not adjacent to one another. The coiled split lip seal is further preferably fashioned from flat-sheet material as in a strip and the lip formed by a bend in the material. The term "coiled seal" as used is meant to encompass spirals and helices.

The seal may contain advantageously a material selected from the group consisting of: polytetrafluoroethylene, ethylene tetrafluoroethylene copolymer, fluorinated ethylene-propylene, perfluoroalkoxy fluorocarbon. Other material capable of performing the sealing function in the environment of use may also be used. A preferred material for the manufacture of such seal has, based on a 0.8 mm sheet thickness, a thermal conductivity of between 0.025–0.4 Btu·ft/hr·ft$^2$·° F., more preferably between 0.05–0.3 Btu·ft/hr·ft$^2$·° F., and yet more preferably between 0.1–0.2 Btu·ft/hr·ft$^2$·° F. (ASTM F433); a modulus at 100% elongation of between 500–4000 psi, more preferably between 1000–3000 psi, and yet more preferably between 1500–2500 psi (ASTM D1708); and a tensile modulus of at least 500 psi, more preferably at least 1000 psi and yet more preferably at least 2000 psi (ASTM F152). A particularly preferred seal material comprises polytetrafluoroethylene, and more preferably a polytetrafluoroethylene composite with one or more lubricant additives, such as graphite, talc, etc., and/or fillers, such as barium sulfate, silica, and glass micro balloons. The PTFE composite may be reinforced with flexible thin metal and, in particular, a perforated metal sheet, such as perforated steel, such as found in the material Gylon®. Such material unexpectedly provides for a superior seal, albeit such material is malleable and flexible at room temperature and, in particular, about 20° C. The seal is advantageously of such shape as to sealedly-fit about the structure it is intended to be placed. The seal is typically annular in shape. The lip preferably traverses about one edge of the material along the expanse of the entire coil.

The lip of the seal described herein is preferably formed by bending the coiled material along the length of the coil. Most preferably the material is folded along the entire course of the coiled material. Preferably the coiled material is folded such that the portion of the material above the fold is at an angle of 90° or more with respect to the portion of material below the fold, the material above the fold comprising the lip. Preferably the material is coiled such that the coils are of about equal diameter. Preferably the material is coiled in such a manner that material comprising any preceding coil does not extend outside the circumference of any succeeding coil.

The stock material used to make the seal is preferably cast or molded in a flat sheet. The flat sheet material is then preferably shaped into a coiled split seal. The material is preferably of a thickness between 0.03–0.05", more preferably between 0.035–0.045". The lip may be formed by bending the flat sheet material along a traverse axis along the coiled strip's length. Preferably, the bend is made medially along the course of the coil. The material preferably is flexible and malleable at room temperature and, in particular at about 20° C., but is able to retain a bend after deformation of the material.

While the stepped shelving of the coiler described above which may be used to coil the flat stock material is preferably continuous along its run on the rotatable winding shaft, as would be understood by one of ordinary skill in the art, such shelving may also be discontinuous at points along its run up the shaft. Preferably the flat material is coiled widthwise on the coiler, such that the width of the coil is maximized. Preferably, the continuous stepped shelving is of a width about the width of the flat sheet material to be coiled. Advantageously, a rotational drive motor is attached to the winding shaft of such coiler so as to permit controlled rotation of the winding shaft. Advantageously, the rotational drive motor is controlled by a processor means, such as a computer, microprocessor, multiplexer, etc.

A shaping die for forming a bend in coiled flat sheet material, surrounding a coil void, finding use in manfacture of the coiled split lip seal of the present invention comprises: a vise comprising a first and second die body, each die body having an upper surface and a lower surface and surrounding a generally cylindrical void symmetrical about a central axis passing from the upper surface to the lower surface of the body, a means for clamping said first and second die body in such a manner that the central axis of each die body void is aligned, and a generally cylindrical plunger for plunging coiled flat material positioned between said first and second die body of said vise, wherein each body void is of such dimension as to be more than the width of said plunger throughout, less than the width of said coiled flat material at least in portion along its course, and more than the width of said coil void throughout. By means for clamping, it is meant any means for pressing the first and second die bodies together, including, without limitation, a clamp, a vise, a bolt cursing through both bodies and affixed therein or there out, etc. Preferably the coiled flat material which is to be bent is coiled in the shape of a closed plane curve, more preferably a circle. Preferably the die body void is of the same shape throughout the course of the void as the shape of the coiled flat material when viewed along its width (e.g. circular). Preferably the plunger is dimensioned smaller than the smallest width of the die body void by at least the width of the coiled flat material.

Another shaping die for forming a bend in coiled flat sheet material surrounding a coil void, which may be employed in manufacturing the coiled split lip seal of the present invention comprises: a plunger; first and second die bodies having an upper surface and a lower surface, and a means for clamping said first die body to said second die body; wherein said first die body surrounds a void passing from said upper surface to said lower surface of such dimension as to be throughout more than the width of said plunger, less than the width of the coiled flat material and more than the width of said coil void; and wherein said second die body surrounds a void passing from said upper surface to said lower surface and wherein said second die body is counter bored such as to have an internal step impinging within said second body void, such step resulting in the base portion of the second die body having a void opening of smaller dimension than said top portion of the second die body, and wherein the step is so dimensioned such that when the coiled flat sheet is placed on the step the coil void is centered within the base void opening; and wherein said base void opening is of such dimensions as to be more than the width of said plunger, less than the width of the coiled flat material, and more than the width of the coil void, and wherein said top void opening is larger than said base void opening and is about equal to the void opening of the first die body.

Figures 1, 2:
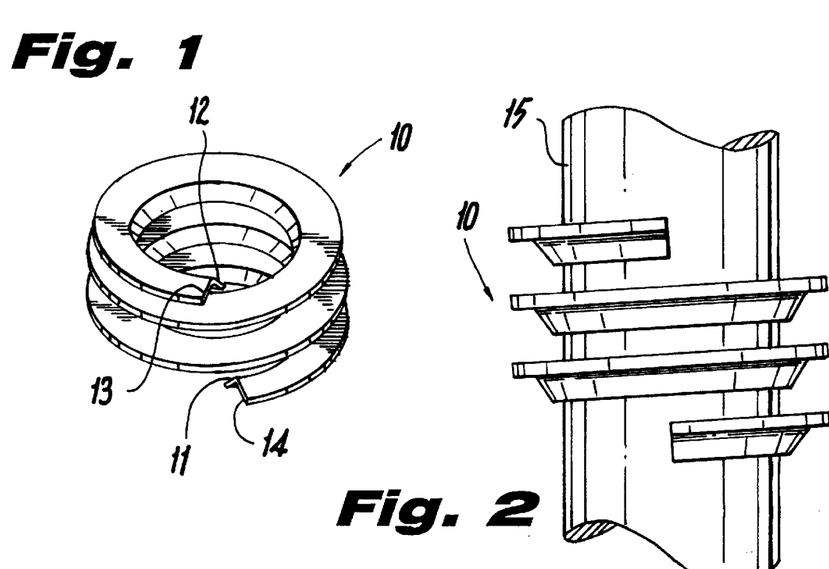
FIG. 1 is a side elevational view of a coiled split seal bent along its longitudinal axis to form a coiled split lip seal.
FIG. 2 is a perspective view of a coiled split lip seal of FIG. 1 as applied to a shaft in a manner in accordance with a presently preferred embodiment of the subject invention.

Referring now to the drawings, wherein like reference numerals identify similar structural elements of the subject invention, there is illustrated in FIG. 1 a coiled split lip seal constructed in accordance with the present invention, each such coiled split lip seal designated by the reference numeral 10. As would be appreciated by one of skill in the art, the novel coiled split lip seal of the present invention obtains advantages unattainable with present seals. The spiral lip seal permits improved pressure against the radial face of the shaft or other item to which it is attached, permits an improved self-adjusting seal, allows for ease of repair of worn operational seals, and significantly improves sealability over prior art integral seals, split seals, and lip seals.

Referring now in detail to FIG. 1, there is shown a side elevational view of a coiled split seal bent along an longitudinal axis along the coil to form a coiled split lip seal 10. As illustrated, the bend 11 in the material is generally made medially along the course of the stock to form a lip 12. The ends of the coiled split lip seal, 13 and 14, are preferably separated by one or more coils of stock as shown.

Referring now to FIG. 2, there is shown a perspective view of a coiled split lip seal 10 of FIG. 1 as applied to a shaft 15 in a manner in accordance with an embodiment of the subject invention. The lip 12 comprises the bent material in sealed relationship to shaft 15.

Figure 9:
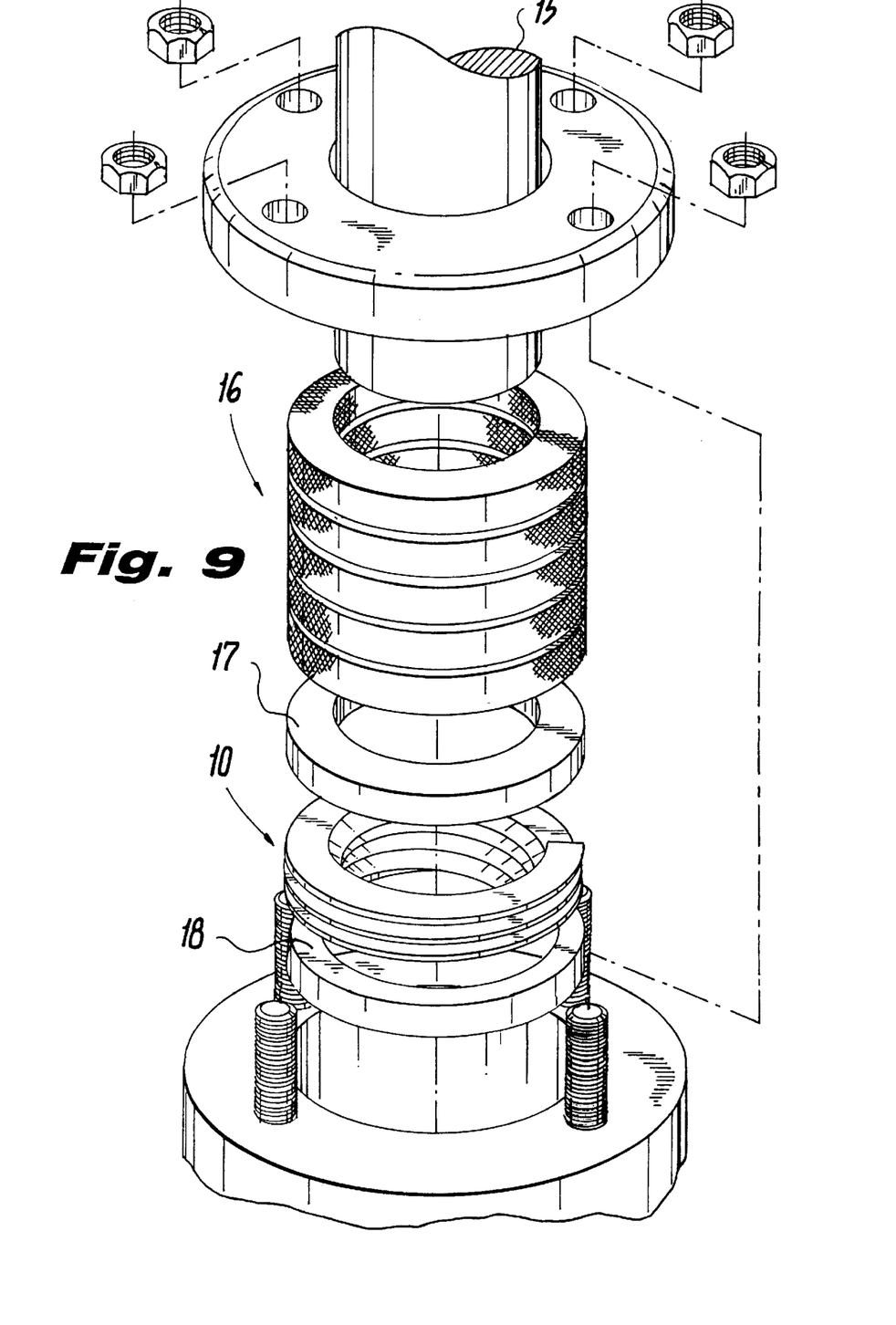
FIG. 9 is an exploded side elevational perspective of a coiled split lip seal of the present invention wound about an shaft and interposed between a plurality of spacers.

FIG. 9 is a side elevational view of a coiled split lip seal arrangement, wherein coiled split lip seal 10 is to be wound about shaft 15 and interposed between a plurality of spacers 16, 17 and 18. The spacers, 17 and 18, in interface with coiled split lip seal 10 are preferably constructed of the same material as the coiled split lip seal.

Figure 10:
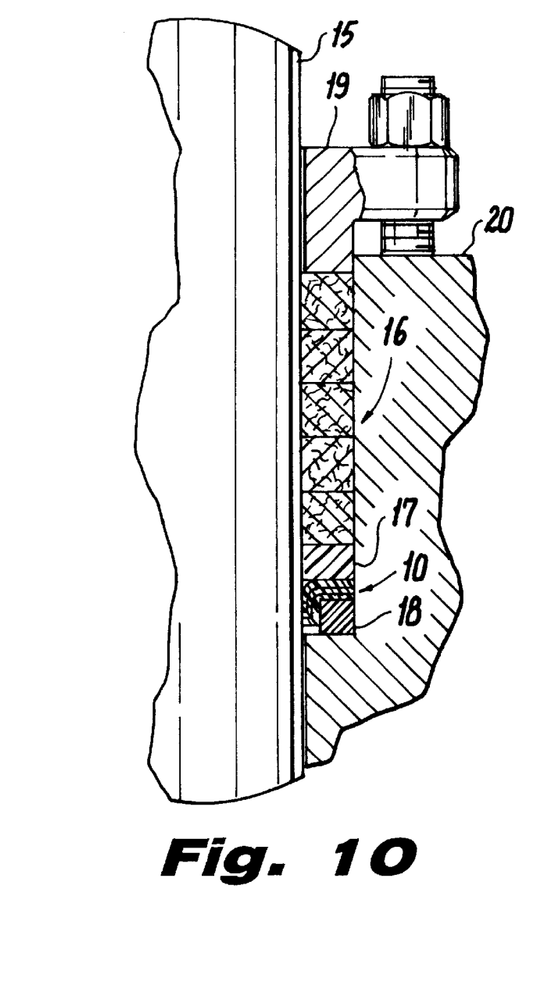
FIG. 10 is a partial side cross-section of a coiled split lip seal of the present invention inserted into the stuffing box surrounding a shaft in conjunction with a packing set and spacers.
Figure 11:
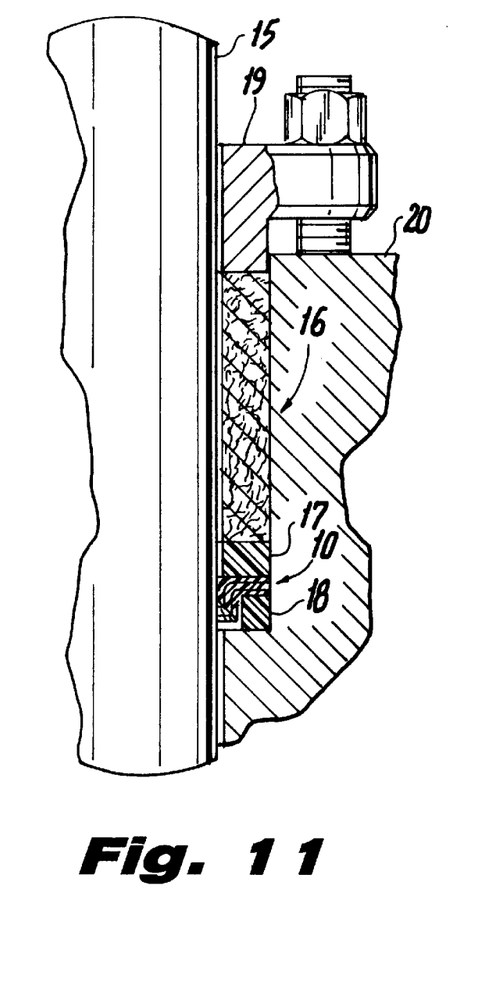
FIG. 11 is a partial side cross-section of a coiled split lip seal of the present invention inserted into the stuffing box surrounding a shaft in conjunction with a spacer.
Figure 12:
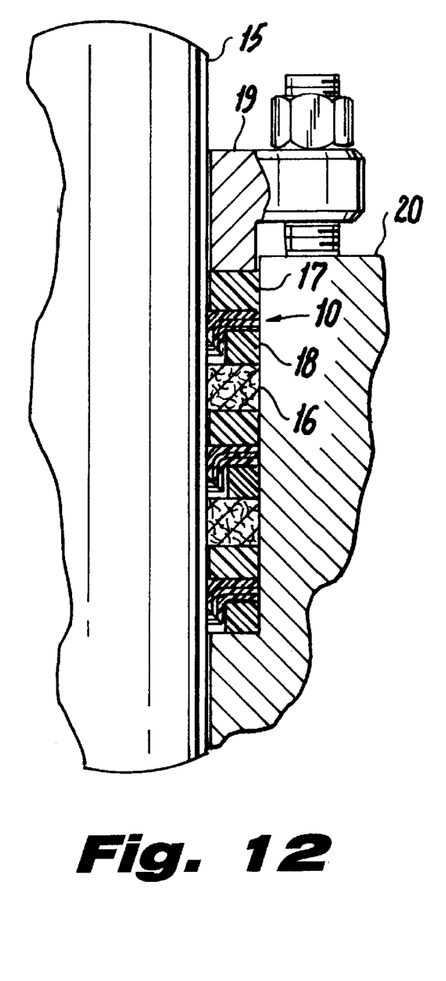
FIG. 12 is a partial side cross-section of a plurality of coiled split lip seals of the present invention separated by spacers.

FIGS. 10–12 show several different arrangements of coiled split lip seals 10 and spacers 16, 17, 18 in the stuffing box 19 of a stuffing box housing 20 surrounding a shaft 15. Singular (See e.g. FIGS. 10, 11) or multiple (See e.g. FIG. 12) coiled lip seals 10 may be employed in the stuffing box, as well as single (See e.g. FIG. 11) or multiple (See e.g. FIGS. 10 and 12) spacers.

Figure 13:
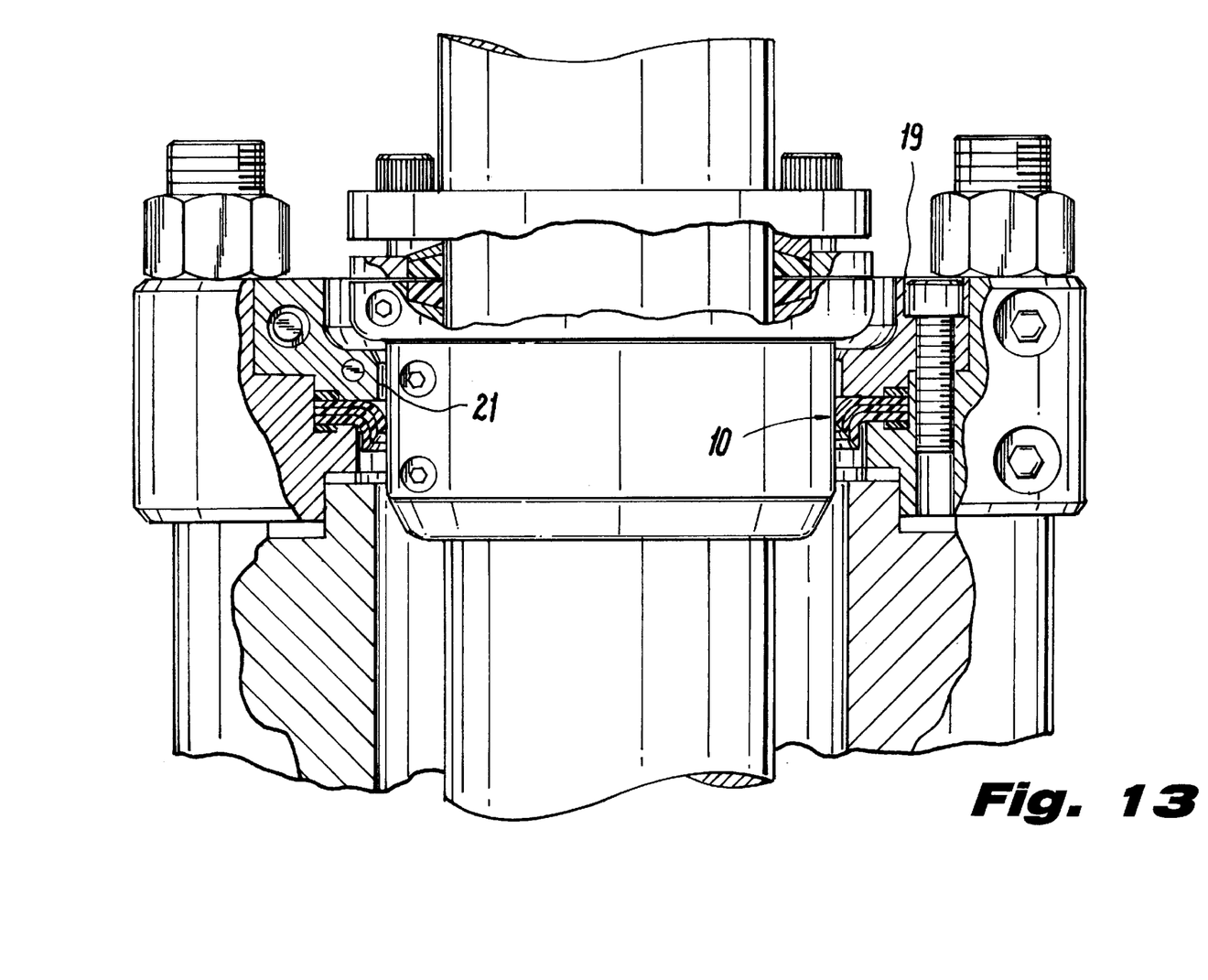
FIG. 13 is side view with partial cut-aways showing employment of the coiled split lip seal of the present invention in a split mechanical cartridge type seal.

Now referring to FIG. 13 there is shown a side view with partial cut-aways showing employment of the coiled split lip seal 10 of the present invention in a split mechanical cartridge type seal 21 engaged in the stuffing box 19 of a stuffing box housing 20.

Now referring to FIGS. 3–8, there is shown a method of manufacture of a coiled split lip seal 10 of the present invention.

Figure 3:
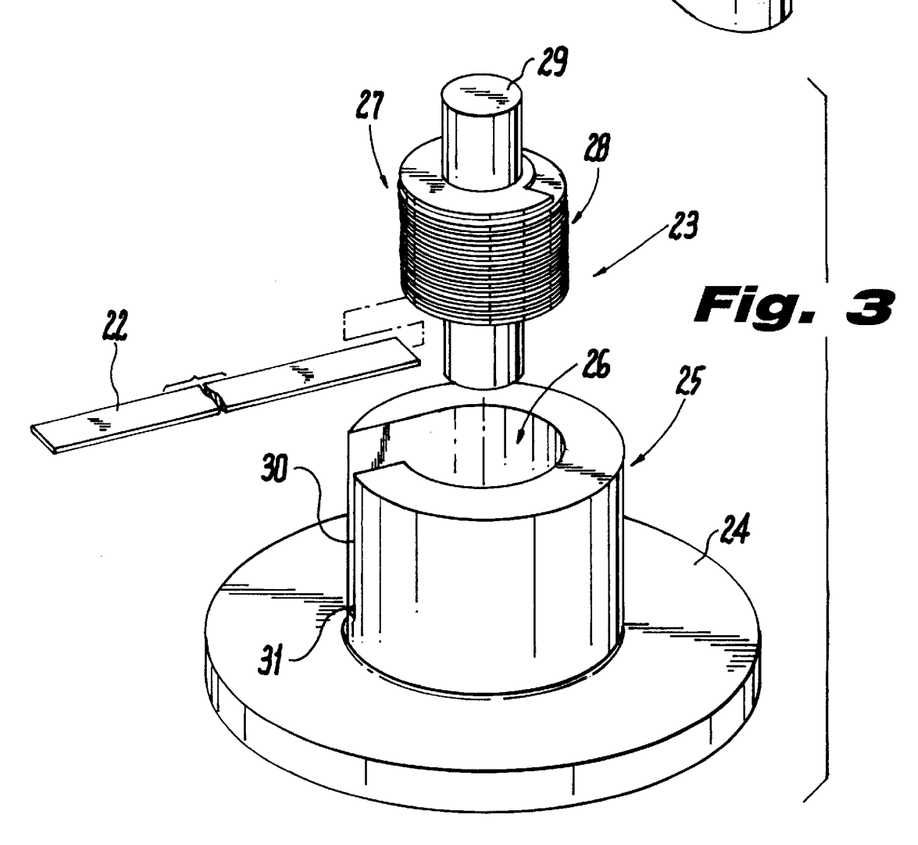
FIG. 3 is a side elevational view of the elements of a flat sheet coiler useful for making coiled split lip seals from flat sheet material.
Figure 4:
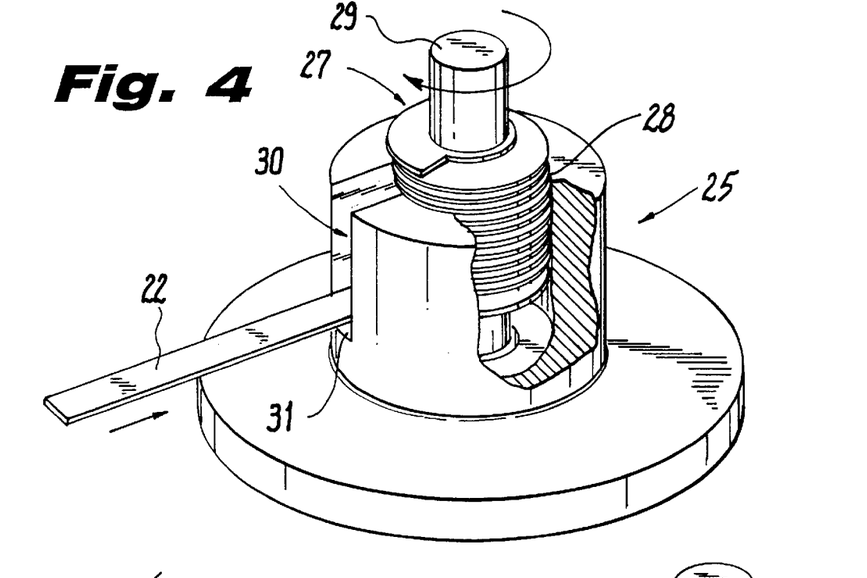
FIG. 4 is a side elevational partial cut-away view of the flat sheet coiler of FIG. 3 in operation.
Figure 5:
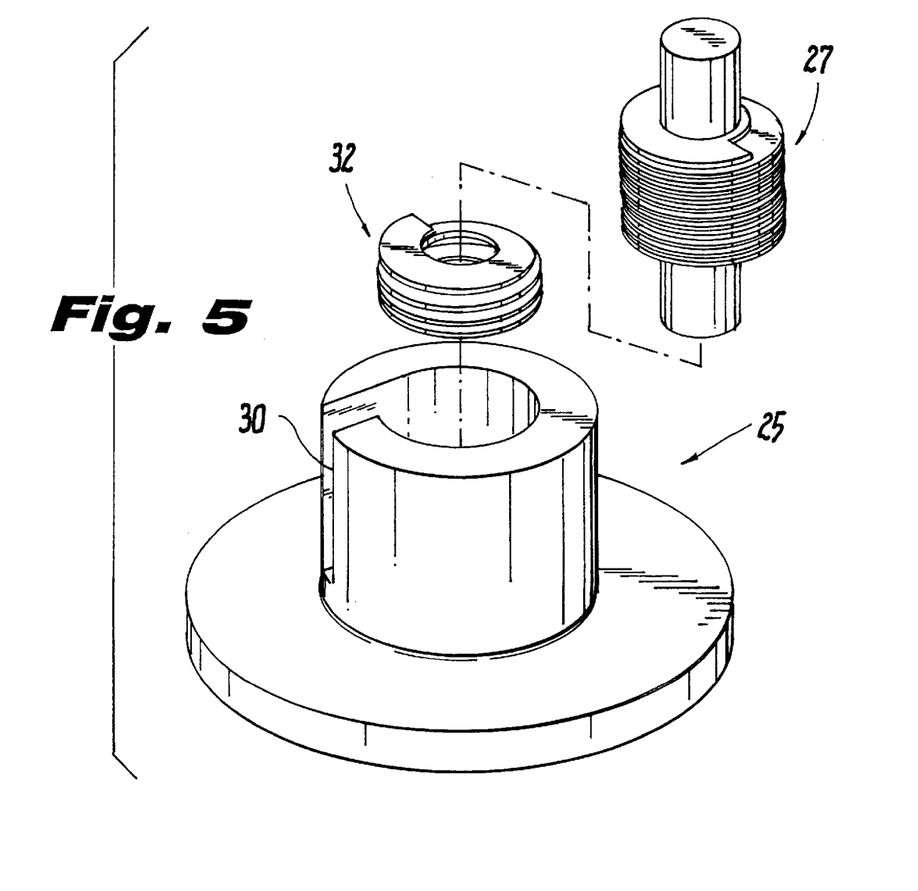
FIG. 5 is an exploded side elevational view of the elements of the flat sheet coiler of FIG. 4 after the coiling operation of FIG. 4.

As shown in FIG. 3, flat material 22, preferably in the form of a sheet, may be coiled on a coiler 23 comprising: a base 24; a hollow tubular housing 25 affixed to base 24, such hollow tubular housing enclosing a uniform cylindrical void 26; and a rotatable winding shaft 27 positioned in the void having continuous stepped shelving 28 coursing about a rotatable shaft 29. As shown, the tubular housing 25 has an opening 30 in the body of the housing of such dimensions as to permit the flat material 22 to fit through opening 30. The bottom opening portion 31 of opening 30 is positioned in the tubular housing body in such a manner that feed of the flat material 22 across the bottom opening portion 31 of opening 30 causes the flat material 22 to be engaged between the continuous stepped shelving 28. Preferably the continuous stepped shelving is of a width about the width of the flat material to be coiled and the steps are coiled such that the space between parallel step portions are at least the same as, and preferably more than, the thickness of the flat material to be coiled. Preferably the uniform cylindrical void is formed by a smooth bore in the tubular housing. The operation of the device of FIG. 3 is shown in FIG. 4 in a side elevational partial cut-away view. Flat material 22 is fed width-wise through opening 30 along bottom portion 31 and is engaged by continuous stepped shelving 28. Rotation of rotatable shaft 29 causes flat material 22 to be drawn into tubular housing 25 causing flat material 22 to be coiled. As illustrated in FIG. 5, coiled flat material 32 may be removed from rotatable winding shaft 27 upon removal of the rotatable winding shaft 27 from tubular housing 25.

Figures 6, 7, 8:
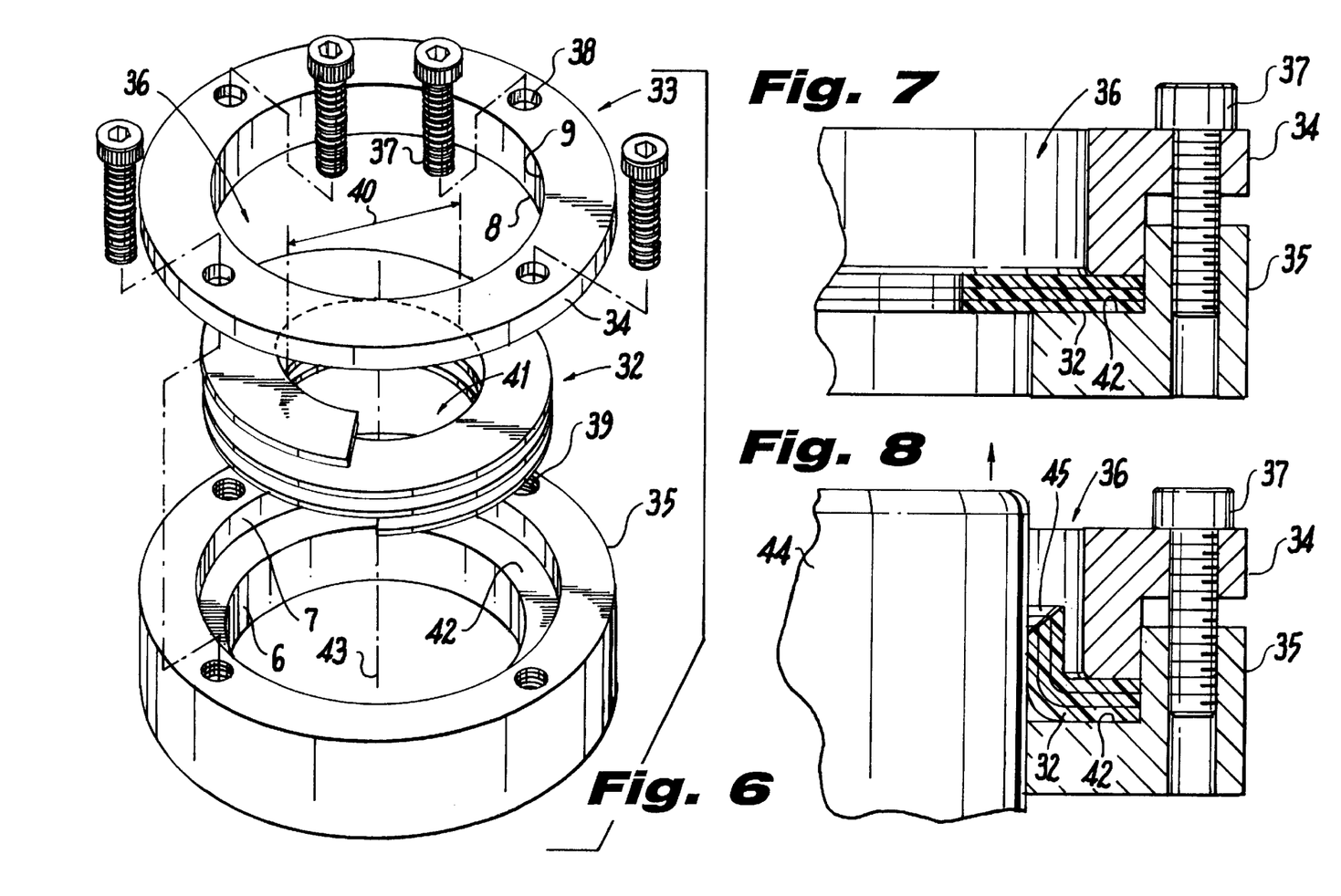
FIG. 6 is an exploded elevational view of a coiled flat material vise of the present invention.
FIG. 7 is a partial cut-away side view of a shaping die for forming a bend in coiled flat material held in the vise of FIG. 6.
FIG. 8 is a partial cut-away side view of the shaping die of FIG. 7 in operation.

A lip 12 may be formed on coiled flat material 32 using the device and methods depicted in FIGS. 6–8.

FIG. 6 illustrates an elevational view of a coiled flat material vise 33 of the present invention. The vise is generally comprised of a first die body 34 and second die body 35, each die body having an upper surface and a lower surface, and surrounding a generally cylindrical first die body void 36 and second die body void 39 passing from the upper surface to the lower surface of the body, and a means for clamping the first die body 34 to said second die body 35, for example, as illustrated threaded fasteners 37 feeding through drilled holes 38 in first die body 34 into corresponding threaded holes 39 found in second die body 35. As shown, upper and lower surface void openings of first die body 34 are of such dimension as to be less than the width of the coiled flat material 32 to be vised, but more than the coil void width 40 of the coil void 41.

As illustrated, upper surface void opening 9 of first die body 34 is generally of the same size as lower surface void opening 8 of first die body 34 and the void 36 is generally uniformly cylindrical about a central axis. Second die body 35 is shown to be counter bored so as to have an internal step 42 impinging within the second die body void 39, such step resulting in the lower surface of said second die body 35 having a lower surface void opening which is smaller in dimension than the upper void opening of the upper surface of second die body 35. As shown, internal step 42 is constructed to position the coiled flat material 32 when it is placed on the internal such that the coiled flat material 32 is centered about the central axis 43 of the second die body void 39. As illustrated, the lower void opening in the second die body 39 is of such dimensions as to be less than the width of the coiled flat material and more than the coil void width 40. Upper void opening 7 of second die body 35 generally should be larger than lower void opening 6 and preferably about equal to the lower surface void opening 8 of the first die body 34.

FIGS. 7 and 8 illustrate a lip forming die 43 useful in forming lips in coiled flat material 32. Lip forming die 43 is comprised of coiled flat material vise 33 of FIG. 6 and plunger 44 which is operationally associated therewith. Plunger 44 is dimensioned such as to fit snugly within second die body 35 lower void opening, and to fit through second die body 35 upper void opening, first die body 34 lower surface void opening, and first die body 34 upper surface void opening and through the course of the void encompassed when first die body 34 and second die body 35 voids are aligned along their central axes. As illustrated in FIG. 7, coiled flat material 39 is placed on internal step 42. Internal step 42 is dimensioned such that when positioned thereon a portion of the coiled flat material 32 will hang over the step. Coiled flat material 32 is vised between first die body 34 and second die body 35 by a means for clamping, such as, for example, threaded fasteners 37 such that the central axes of their voids are aligned. As seen in FIG. 8, movement of plunger 44 from a first position below the vised coiled flat material 32 into the void of first die body 34, causes the coiled flat material 32 to be bent along the course of the coils, thereby forming lip 45 on coiled flat material 32.

While the invention has been described with respect to preferred embodiments, those skilled in the art will readily appreciate that various changes and/or modifications can be made to the invention without departing from the spirit or scope of the invention as defined by the appended claims.

What is claimed is:

1. A split sealing member for a rotary shaft comprising:
   a coiled body, with non-adjoined ends, having a plurality of turns about a central axis, bent along the course of said body such that said body is divided into a radially-inner portion and a radially-outer portion wherein said radially-inner portion defines a first plane and said radially-outer portion defines a second plane which is substantially transverse to said central axis;

wherein said coiled body is composed of a material composition, based on a 0.8 mm sheet thickness, having: a thermal conductivity of between 0.025–0.4 Btu 9 ft/hr*ft$^2$*° F. (ASTM F433); a modulus at 100% elongation of between 500–4000 psi (ASTM D1708); and a tensile modulus of at least 500 psi (ASTM F152).

2. The sealing member of claim 1 wherein said body contains a material selected from the group comprising: polytetrafluoroethylene, ethylene tetrafluoroethylene copolymer, fluorinated ethylene-propylene or perfluoroalkoxy fluorocarbon.

3. The sealing member of claim 1 wherein said body has a material thickness of between about 0.03 to about 0.05 inch.

4. The sealing member of claim 1 wherein said body has a material thickness of between about 0.035 to about 0.045 inch.

5. The sealing member of claim 1 wherein said body comprises: filled polytetraflouroethylene.

6. The sealing member of claim 5 wherein said body further comprises: perforated steel.

7. A split sealing member for a rotary shaft comprising:
a coiled body, with non-adjoined ends, having a plurality of turns about a central axis, bent along the course of said body such that said body is divided into a radially-inner portion and a radially-outer portion wherein said radially-inner portion defines a first plane and said radially-outer portion defines a second plane which is substantially transverse to said central axis;

wherein said coiled body is composed of a material composition having, based on a 0.8 nun sheet thickness, a thermal conductivity of between about 0.05 to about 0.3 Btu*ft/hr*ft$^2$*° F. (ASTM F433); a modulus at 100% elongation of between about 1000 to about 3000 psi (ASTM D1708); and a tensile modulus of at least about 1000 psi, (ASTM F152).

8. A split sealing member for a rotary shaft comprising:
a coiled body, with non-adjoined ends, having a plurality of turns about a central axis, bent along the course of said body such that said body is divided into a radially-inner portion and a radially-outer portion wherein said radially-inner portion defines a first plane and said radially-outer portion defines a second plane which is substantially transverse to said central axis;

wherein said coiled body is composed of a material composition, based on a 0.8 mm sheet thickness, having: a thermal conductivity of between about 0.1 to about 0.2 Btu*ft/hr*ft$^2$*° F. (ASTM F433); a modulus at 100% elongation of between about 1500 to about 2500 psi (ASTM D1708); and a tensile modulus of at least about 2000 psi (ASTM F152).

9. A split sealing member for a rotary shaft comprising:
a coiled body, with non-adjoined ends, having a plurality of turns about a central axis, bent along the course of said body such that said body is divided into a radially-inner portion and a radially-outer portion wherein said radially-inner portion defines a first plane and said radially-outer portion defines a second plane which is substantially transverse to said central axis, wherein said coiled body is composed of a material composition which is malleable at room temperature.

10. A flat sheet material coiler for coiling flat sheet material comprising:
a) a base;
b) a hollow tubular housing operatively connected to said base, said hollow tubular housing enclosing a uniform cylindrical void;
c) a rotatable winding shaft operatively positioned in the void of said hollow tubular housing, said rotatable winding shaft having continuous stepped shelving coursing about said rotatable winding shaft;
wherein said hollow tubular housing further includes: an opening in the body of the housing having a top portion and a bottom portion, said opening being dimensioned as to permit said flat sheet material to fit through the opening, and said bottom portion of said opening being positioned such that said flat sheet material in fed along said bottom portion of said opening causes said flat sheet material to be engaged between said continuous stepped shelving of said rotatable winding shaft.

11. A die for applying a lip to coiled flat material surrounding a coil void, the die comprising:
a) a first die body having an upper surface and a lower surface and surrounding a uniform cylindrical void about a central void axis passing from said lower surface to said upper surface such that said first die body has an upper void opening and a lower void opening therein;
b) a second die body having an upper surface and a lower surface, said second die body surrounding a generally cylindrical void about a central void axis passing from said lower surface to said upper surface, such that said second die body has an upper void opening and a lower void opening therein, said generally cylindrical void being interrupted by a counter bored internal step in said second die body, whereby such generally cylindrical void is divided into a larger diameter cylindrical void on top of a smaller cylindrical void;
c) means for clamping said first die body to said second die body such that the central void axes of each die body are aligned;
d) a cylindrical plunger operatively associated with said first and said second die bodies and said means for clamping.

12. The die of claim 11 wherein said cylindrical plunger is positioned along the central void axis of the clamped first and second die bodies.

13. The die of claim 11 wherein said, upper and lower surface void openings of said first die body are of such dimension as to have a width that is less than the width of the coiled flat material, more than the width of the coil void and more than the width of the cylindrical plunger and wherein said internal step of said second die body void is dimensioned to position said coiled flat material upon which such a lip is to be formed, when said coiled flat material is placed on said internal step, such that said coiled flat material is centered about the central void axis of said second die body void with a portion of the coiled flat material hanging off the internal step into the second die body void and wherein said lower surface void opening of said second die body is of such dimensions as to be less than the width of the coiled flat material, more than the coil void width, and more than the width of the cylindrical plunger and said upper void opening of second die body is of such dimensions as to be more than the width of the coiled flat material, more than the coil void width, and more than the width of the cylindrical plunger.

14. A method of manufacturing a coiled split sealing member comprising the steps of:
 a) winding a flat sheet of material width-wise about a coiler shaft having continuous stepped shelves thereon;
 b) removing the wound flat sheet material from said coiler shaft so as to obtain a wound flat sheet coil;
 c) placing the wound flat sheet coil between two die bodies having a generally cylindrical bore in such a manner that the central axis of the bore of each body is aligned with the other, thereby forming a thorough bore, and such that one circumferential portion of the wound flat sheet coil is held between the die bodies and a second circumferential portion hangs into the thorough bore;
 d) clamping the two die bodies together;
 e) plunging a plunger through the thorough bore between the two die bodies to form a bend along the longitudinal course of said flat sheet coil;
 f) removing said bent flat sheet coil from between said two die bodies.

* * * * *